Nov. 11, 1952 A. H. LORD, JR., ET AL 2,617,945
PROSPECTING USING GAMMA RAY DETECTION
Filed March 9, 1948 2 SHEETS—SHEET 1
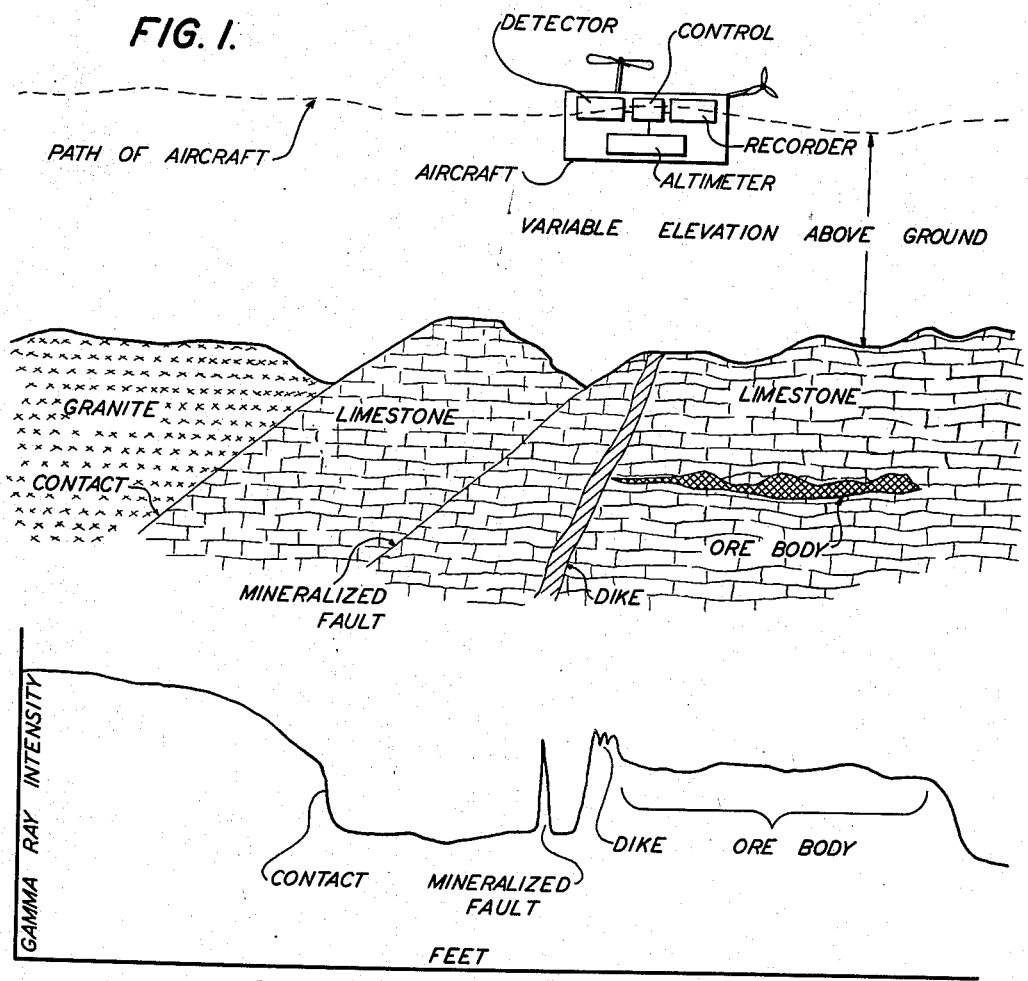
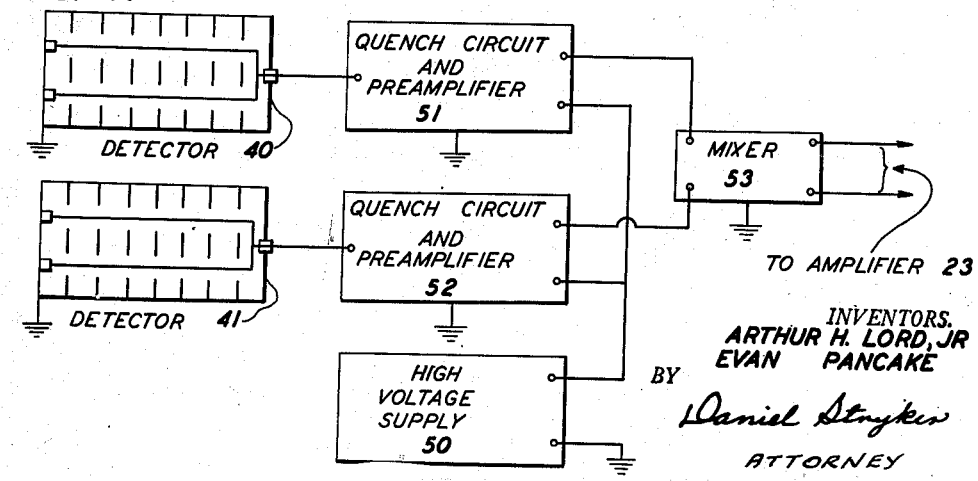
INVENTORS.
ARTHUR H. LORD, JR
EVAN PANCAKE
BY
Daniel Stryker
ATTORNEY

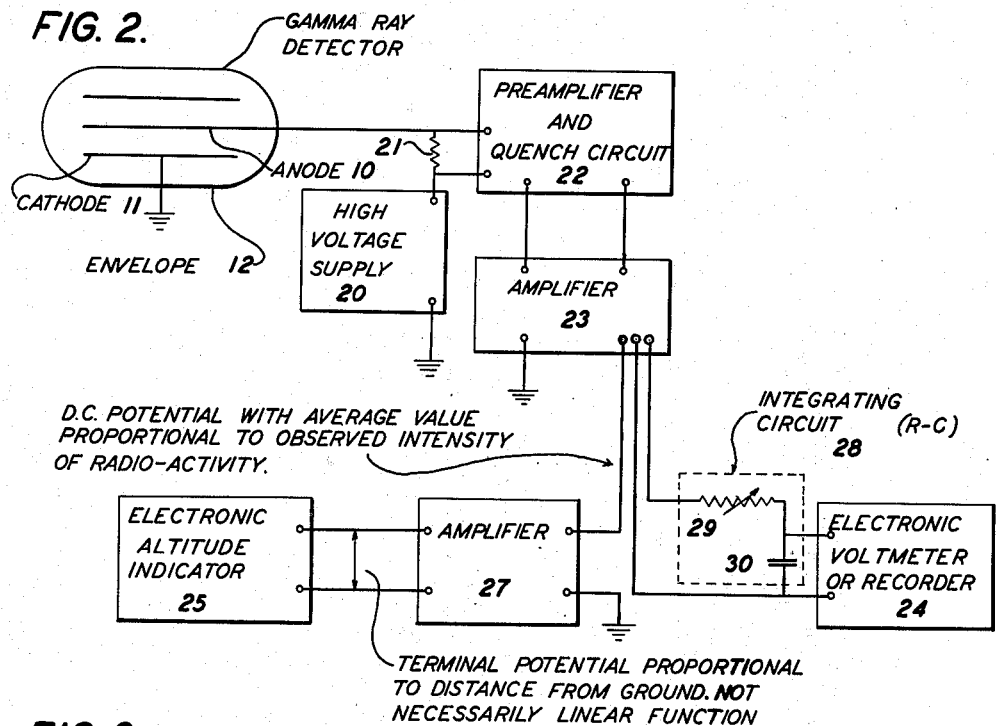
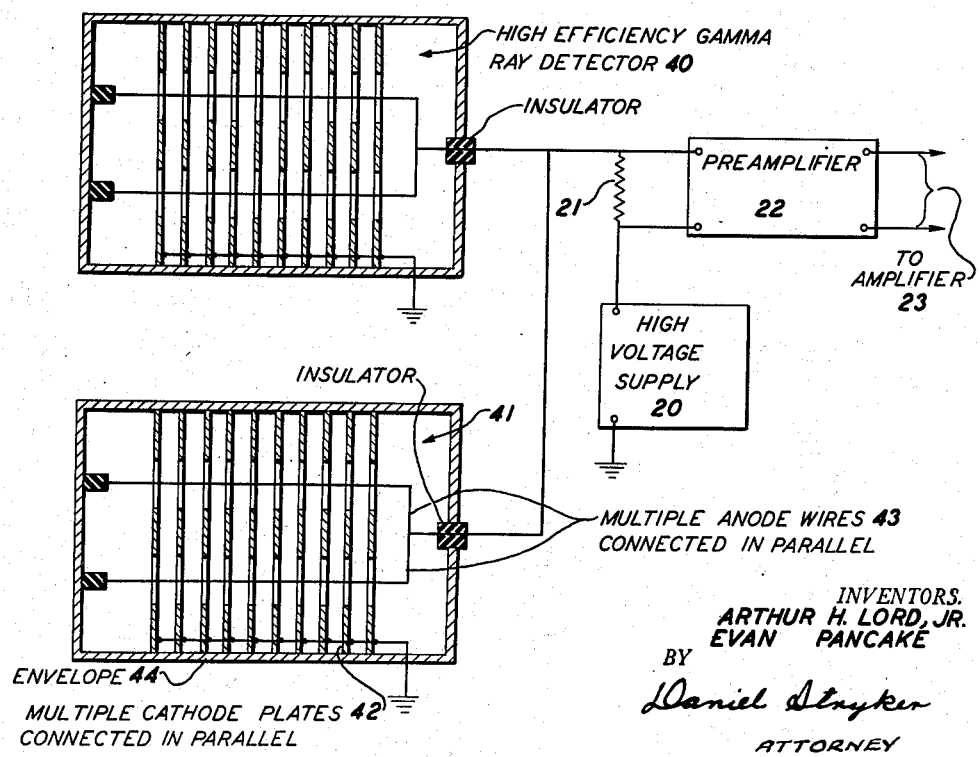

Patented Nov. 11, 1952

2,617,945

UNITED STATES PATENT OFFICE 2,617,945

PROSPECTING USING GAMMA RAY DETECTION

Arthur H. Lord, Jr., Houston, and Evan Pancake, Bellaire, Tex., assignors to The Texas Company, New York, N. Y., a corporation of Delaware Application March 9, 1948, Serial No. 13,844

3 Claims. (Cl. 250—83.6)

This invention is concerned with geophysical prospecting and particularly with geophysical surveys involving the detection of variations in the intensity of gamma rays emanating respectively from different points or zones along a traverse on an earth surface. The invention provides improvements in methods and apparatus for this purpose and is particularly useful in geophysical surveys employing airborne gamma ray detectors.

As disclosed in co-pending application Serial No. 13,842, filed March 9, 1948, it is possible to discover radioactive anomalies indicative of the presence of ore bodies and geological features such as faults, contacts, intrusions, etc, with gamma ray detectors of high efficiency. Thus it has been discovered that ore bodies which are so deeply buried that gamma radiation, if any, originating in the ore body is substantially completely absorbed by the overburden, may still be discovered by measuring differences in the intensity of gamma radiation originating close to the surface in the overburden itself. In other words, the presence of an ore body which is in itself not substantially radioactive (or if radioactive is so deeply buried that radiation originating in the ore body is so completely absorbed by the overburden that it does not serve to reveal the ore body) may still be detected by faintly radioactive "auras" in the barren overburden. Moreover, the differences in intensity which are noted when passing from one geological formation to another across a fault or contact are of great aid in geological mapping.

Given a detector of adequate size and efficiency, significant differences in gamma ray intensities along a traverse on the earth's surface may be detected even though the detector is several hundred feet in the air above the surface and is carried along the traverse at high velocity. Consequently, large scale geophysical surveys can be made rapidly and efficiently with airborne instruments, for example, a high efficiency gamma ray detector carried in a helicopter.

In carrying out such a survey it is desirable that the detector be flown along the traverse while maintaining a constant elevation above ground, for variations in this elevation cause changes in observed intensity. However, gamma radiation surveys of the type under consideration find much application in prospecting for deposits of metallic minerals, for example, ore bodies of copper, lead, iron, etc., and these generally occur in mountainous terrain—where the relief is such that it is difficult to fly a traverse maintaining even approximately a constant elevation above ground. Even in relatively flat terrain such an operation is not easy. If the elevations of the instrument and of the surface along the course of the traverse are known, it is, of course, possible to correct the observed intensities for the differences of elevation above ground. Such an expedient however, is tedious and may require extensive topographical mapping since a surface profile must be run along each traverse and the elevation of the instrument for each reading must be determined.

In accordance with the instant invention, the foregoing difficulties are eliminated by automatically correcting the observed gamma ray intensities for changes in elevation of the detector. Thus the invention contemplates apparatus for measuring gamma radiation from the earth which comprises a gamma ray detector, an indicator for registering the intensity of the detected gamma rays, an altimeter, and means for automatically varying the response of the indicator to the detector with changes in elevation detected by the altimeter. The entire combination may be, and preferably is, mounted in an aircraft, which may be considered as cooperating with the combination in producing the result, since it carries the detector and associated apparatus rapidly along the traverse being surveyed.

The altimeter employed may be of various types. In relatively flat terrain an aneroid barometer is useful as the governor for the automatic compensation means. However, in areas of high relief an electronic altimeter, say one of the echo ranging type, is almost essential and is desirable even in flat country. Such an altimeter, instead of detecting elevation above sea level or some other datum plane, detects the absolute distance between the airborne detector and the ground, and may permit more accurate compensation for loss of intensity of gamma radiation in this distance.

These and other aspects of the invention will be more thoroughly understood in the light of the following detailed description, taken in conjunction with the accompanying drawings in which:

Fig. 1 is a diagram illustrating a survey conducted in accordance with the invention employing an airborne detector with an automatic compensator which governs the registered gamma ray intensity;

Fig. 2 is a block diagram of apparatus for the practice of the invention;

Fig. 3 is a diagram illustrating a modification of the apparatus of Fig. 2 with a conventional Geiger-Mueller detector replaced by a battery of high efficiency plate-type detectors; and Fig. 4 is a wiring diagram illustrating a further and preferred arrangement for employing a battery of high efficiency detectors.

Referring to Fig 1, an aircraft, say a helicopter, is shown flying along a traverse at varying elevation, both with respect to a level datum plane and the earth's surface. A vertical plane drawn through the traverse shows a partial geological section. Thus the aircraft, in flying from right to left at varying elevation approximating 200 feet, first passes over a flat lying ore body, say a lense of galena in limestone. Next in the traverse is a dike of igneous rock, say andesite, which penetrates the limestone and outcrops. This is followed by a mineralized fault in the limestone, the rock on both sides of the fault being the same, and then a contact between limestone and granite.

The gamma ray intensity, referred to a plane at constant elevation above the ground, is measured by equipment carried in the aircraft. The equipment consists of a gamma ray detector, preferably one of high efficiency and large size, a recorder for the intensity of the gamma radiation detected, an altimeter, and a control circuit interconnected between the detector, the recorder and the altimeter. The altimeter determines the vertical distance of the detector above the ground level, and preferably is of the electronic echo-ranging type which produces an output potential which varies as the distance above ground. The control circuit may be of the types used for automatic volume control in radio receivers and is designed to vary the amplitude of the intensity registered by the recorder to compensate for changes in elevation above ground. Thus, as the distance changes the amplitude is automatically corrected.

Below the geological section in Fig. 1 is a graph of recorded intensity along the section. Beginning at the right, the gamma ray intensity, adjusted for altitude, is relatively low, since in general gamma radiation from unmetamorphosed limestone is slight. However, in the neighborhood of the ore body the limestone is considerably more radioactive, even though barren of ore, and the recorded gamma ray intensity is higher. In other words, the detector responds to a radioactive aura in the overburden and shows a higher gamma ray intensity. The cause of such auras is not thoroughly understood, and they may be due to the introduction into the overburden of infinitesimal amounts of radioactive minerals at the time the ore body was formed or to the later introduction of radon, thoron, or actinon in gaseous state or dissolved in water. Whatever the reason, such faintly radioactive auras are distinguishable with proper apparatus in a number of cases involving a variety of country rocks (both sedimentary and igneous) and a variety of ore-forming processes including magmatic intrusion, replacement, alteration, etc.

The presence of the acid igneous dike is shown by a sharp increase in intensity which falls off again in the unaltered limestone to the left of the dike but increases sharply as the mineralized fault is crossed. The fault is thus revealed by a positive anomaly, although on occasion mineralized faults exhibit less radio-activity than the rocks on either side and so give rise to a negative anomaly.

As the surface exposure of the contact is passed, there is a sharp increase in recorded gamma ray intensity, indicating that the granite is more radioactive than the limestone, and the observed intensity increases toward the left as the detector becomes more influenced by the underlying granite.

A geologist, following along the traverse on the ground (say from left to right) and knowing the gamma ray intensities recorded as described above in an airborne survey, will recognize the contact between the granite and limestone, the mineralized fault in the limestone, and the outcrop of the acid dike. To the right of the dike, the high positive anomaly in the limestone will suggest the presence of an ore body, say an intruded lense generated by the dike or a replacement deposit. In any event the anomaly will warrant additional investigation, perhaps by more detailed gamma ray intensity surveys conducted on the ground, followed by core drilling or other type of exploratory excavation.

Were it not for the compensation of gamma ray intensity for altitude, variations in this factor might produce apparent anomalies which would be false and misleading.

A clear understanding of the instrumentation involved in the practice of the invention will be gained from Fig. 2. The apparatus there illustrated comprises a gamma ray detector. This is shown, for purposes of simplicity, as a conventional Gieger-Mueller counter provided with an anode wire 10 concentrically disposed in a metallic cathode tube 11, the two being enclosed in an envelope 12 of glass or the like, filled with an ionizable gas, say a mixture of alcohol and argon, at reduced pressure. Such a detector, if it is sufficiently large and efficient, may detect significant differences in gamma ray intensity at substantial elevation above the ground in which the gamma rays originate. However, because of the relatively low efficiency of conventional Geiger-Mueller counters, which seldom exceeds ½% (only one ray out of 200 entering the active volume of the counter being detected) and because variations in "background" due to cosmic rays, etc., may obscure minor but significant differences in gamma ray intensities, we prefer to employ devices having high active volume or high efficiency and preferably both.

Generally speaking, the bigger the active volume of the detection equipment employed, the greater will be the counting rate. This large active volume may be obtained with a single counter, or with a number connected in parallel (as in Fig. 3), but preferably is obtained with a battery of detectors arranged as shown in Fig. 4 and described later in this specification.

Various types of detectors may be employed, including conventional Geiger-Mueller counters and those of the crystal and ionization chamber varieties. However, for airborne surveys, where the significant differences in intensities may be very small, a detector of high efficiency for gamma rays—say 5% or more—should be employed. One such type of detector is disclosed and claimed in U. S. Patent No. 2,397,071, granted March 19, 1946. It is illustrated diagrammatically in Figs. 3 and 4 which will be described later.

To return to Fig. 2, the conventional Geiger-Mueller counter there illustrated is connected across a D. C. high voltage supply 20 through a resistance 21 and ground, say the frame of the aircraft or other good conductor. Normally the potential difference between the anode and the cathode is nearly, but not quite, high enough to cause an electrical discharge to take place. If an ionizing ray enters the active volume of the detector the gas filling may be ionized with resulting discharge, causing a current flow of the order of a few microamperes and a large voltage drop across the resistance. The discharge will cease after a short time, due to the self-quenching characteristics of the gas filling, which may be aided by a special quench circuit, for example, that described on pages 42–43 of "Radioactivity and Nuclear Physics" by Cork (Van Nostrand, 1947).

An electronic preamplifier 22 is connected across the resistance of Fig. 2 and if desired, a quench circuit may be incorporated in this preamplifier. The output of this preamplifier is sent to a main amplifier 23 (equipped with a conventional automatic volume control circuit as noted in connection with Fig. 1) where the sudden voltage drop across the resistance is further amplified, and the compensated output of this latter amplifier is introduced into an electronic voltmeter or recorder 24 which indicates gamma ray intensity. An electronic altitude indicator 25 of the echo-ranging type is employed to regulate recorded intensity. It has an output potential which varies in proportion to the distance of the indicator above ground, although this is not necessarily a linear function.

For compensation purposes, a potential is required which varies inversely as the effect of altitude on gamma ray intensity at detector height. This is obtained by feeding the output of the altitude indicator or measurer into an amplifier 27 which has the necessary characteristics and whose output potential varies as required above.

The output of the amplifier 27 is connected to the automatic volume control circuit of the amplifier 23, the return being through ground. The control circuit, as indicated in the discussion of Fig. 1, is designed to vary the amplitude of the intensity registered by the recorder to compensate for changes in elevation above ground.

An integrating circuit 28 consisting of a variable resistance 29 coupled with a condenser 30 is connected between the amplifier 23 and the recorder 24.

The resistance 29 is variable, and by adjusting it, the time constant of the integrating circuit may be varied, i. e. it may be made to average potentials over a longer or shorter period.

Other factors being equal, the observed intensity decreases as the distance of the detector above ground is increased. However, the electronic altitude indicator is carried with the detector at approximately the same elevation, its output potential being proportional to a function of the distance above ground. This potential feeds the second amplifier 27. If this second amplifier is properly designed and adjusted, substantially perfect compensation may achieved, with the result that the gamma ray intensity of the earth along the traverse being flown is shown by the voltmeter as if the detector were being flown at constant elevation above ground.

Although in a few cases pronounced anomalies in the intensity of gamma rays emanated along a traverse may be discovered with detectors of ordinary efficiency for gamma rays, practical operations require much higher efficiency, such as is obtainable with the detectors shown in Fig. 3. Referring to this figure, it will be seen that a plurality of high efficiency gamma ray detectors 40, 41 are connected in parallel across the D. C. high voltage supply 20 (in place of the conventional detector of Fig. 2) through the resistance 21. The preamplifier 22 is connected across the resistance as in Fig. 2, the balance of the apparatus, save for the detectors, being as indicated in this latter figure.

Each detector comprises a stack of circular metal plates 42 spaced from each other along the common axis of the plates. The cathode plates are connected in parallel with each other to ground. The cathode plates are perforated to provide free paths for a plurality of anode wires 43 that run perpendicularly through the plates and are connected in parallel to the high voltage supply through the resistance 21. Anodes and cathodes are enclosed in envelopes 44, which are gas-tight brass cylinders, filled with argon and ammonia at a pressure that is slightly sub-atmospheric.

The operation of the apparatus of Fig. 3 is the same as that of Fig. 2 except that the efficiency of gamma ray detection (due to the special construction of the detectors) is higher.

The apparatus of Fig. 4 employs a plurality of multiple plate multiple wire type detectors 40, 41, as in the apparatus of Fig. 3. However, in order to obtain improved resolving power, these detectors are connected to the amplifier 23 in another fashion. A D. C. high voltage supply 50 is connected to the cathode of each detector in parallel thereto through ground and to the anodes of these detectors respectively through quench circuit—preamplifier combinations 51, 52. The preamplifier outputs in turn are sent to an electronic mixer circuit 53 (such for example, as those employed in seismic prospecting equipment) and the output of the mixer in turn is sent to the amplifier, the balance of the equipment being as illustrated in Fig. 1.

The circuit of Fig. 4 is preferred over that of Fig. 3 because it reduces the recovery time of the circuit following quenching by reducing the capacitances of the individual detector circuits and thus reducing the time required for the voltage on the anode to reach a value above threshold potential following discharge. This in turn increases the observed counting rate for a given intensity of radiation.

We claim:

1. In apparatus for measuring gamma radiation from the earth, the combination which comprises a plurality of pulse type detectors for gamma radiation disposed close together and each comprising at least one anode wire and a plurality of apertured cathodes through which the anode passes, the cathodes being connected in parallel with each other, an individual quench-circuit preamplifier for each detector, the input of said amplifier being connected to the anode of its detector, an electronic mixer circuit with the several preamplifier outputs connected to its input, a D. C. high voltage supply connected in parallel to the cathodes of the several detectors and in parallel to the several preamplifiers, an amplifier having its input connected to the output of the mixer, an electronic voltmeter connected to the output of the amplifier, automatic echo-ranging means for determining the height of the detectors above the earth's surface, means connected to said automatic echo-ranging means for automatically increasing the amplification of the amplifier and the response of the voltmeter as the distance determined by the echo-ranging means is increased and vice versa to compensate for the change of gamma ray intensity at the location of the detectors due to the change in said height.

2. In an apparatus for measuring gamma radiation from the earth during a traverse over the earth's surface including a detector for gamma radiation, the combination which comprises an electronic amplifier having its input connected to the detector, an electronic voltmeter connected to the output of the amplifier, automatic means for determining the height of the detector above the earth's surface, and means connected to said automatic height-determining means for automatically increasing the amplification of the amplifier and the response of the voltmeter as the height determined by said height-determining means is increased during the course of the traverse, and vice versa, to compensate for the change in intensity of gamma rays at the location of the detector due to the change in the height of the detector above the earth's surface.

3. In an apparatus for measuring gamma radiation from the earth in the course of a traverse of the earth's surface, the combination which comprises a detector for gamma radiation, an amplifying means connected to the output of the detector, indicating means connected to the output of the amplifying means, automatic means for determining the distance of said detector from the earth's surface during the traverse thereof, and means connecting said automatic distance-determining means to said amplifying means for automatically increasing the amplification of said amplifying means and the response of the indicating means as the distance determined by the distance-determining means during the course of the survey is increased, and vice versa, to compensate for the change in intensity of the gamma rays at the location of the detector due to the change in the distance of the detector from the earth's surface.

ARTHUR H. LORD, JR.
EVAN PANCAKE.

REFERENCES CITED

The following references are of record in the file of this patent:

UNITED STATES PATENTS

| Number | Name | Date |
|---|---|---|
| 2,404,250 | Rajchman | July 16, 1946 |
| 2,499,489 | Goldstein et al. | Mar. 7, 1950 |